«3,310,546
CURABLE CHLOROPRENE POLYMER COMPOSITION AND METHOD OF CURING SAME
Richard Oscar Becker, Wilmington, Del., assignor to E. I. du Pont de Nemours and Company, Wilmington, Del., a corporation of Delaware
No Drawing. Filed Sept. 11, 1963, Ser. No. 308,070
6 Claims. (Cl. 260—92.3)

This invention relates to curing polymers of chloroprene and more particularly to new curing systems which yield cured prodhcts having improved physical properties.

Although the polychloroprene elastomers, when properly compounded and cured, have excellent heat resistance when measured by quantitatively determining the changes in critical properties which take place on aging at elevated temperatures, still further improvement would of couhse be desirable. The same applies to resistanc to permanent deformation (compression set) at elevated temperatures and to resistance to the action of ozone, even though polychloroprene, as ordinarily compounded and cured, is better than most elastomers in these respects.

It is an object of the present invention to provide chloroprene polymer vulcanizates having improved high temperature physical properties and ozone resistance and to a process for obtaining these vulcanizates. It is a further object of the present invention to provide a new combination of curing agents for vulcanizing chloroprene polymers to obtain these improved characteristics. Other objects will appear hereinafter.

Conventionally, many chloroprene polymers are cured with a combination of metal oxides, one of which is usually zinc oxide and the other of which is usually magnesium oxide or lead oxide. It has now been found that important improvements in the heat resistance, permanent set, and other properties of elastomeric chloroprene polymers result when a calcium salt of a carboxylic acid of the aliphatic and hydroaromatic series, which acid contains from 10 to 30 carbon atoms, is used in place of these "other" metal oxides and in combination with zinc oxide.

The amount of zinc oxide to be employed in the new combination of curing agents is about 2 to 20 parts by weight per 100 parts of polymer. The amount of calcium salt employed along with the zinc oxide is about 4 to 20 parts by weight per 1,00 parts by weight of polymer. It is interesting that the quantities of these calcium salts, on a molecular basis, effective in the present invention are much smaller than the amounts of magnesium oxide required in the prior art.

The carboxylic acids from which the calcium salts are derived may be saturated or have single or multiple ethylenic unsaturation. They may also contain hydroxyl and other functional groups, as in ricinoleic acid, which do not interfere with vulcanization.

Representative examples of calcium salts of the aliphatic series, falling within the scope of the present invention, are the salts of the saturated acids, from capric with 10 carbon atoms, through lauric (12), palmitic (16), stearic (18), and behenic (22) to triacontanoic (30). Examples of corresponding unsaturated acids are oleic, erucic, linoleic and linolenic. Representative examples of acids of the hydroaromatic series forming calcium salts within the scope of the present invention are the decahydronaphthalene carboxylic acids and the readily available acids occurring in or derived from pine resin and containing a partly hydrogenated, substituted phenanthrene nucleus of 19 carbons, usually with ethylenic unsaturation, such as abietic, neoabietic, hydroabetic, sapietic and pimaric acids. The use of the calcium salts of many of the acids (both aliphatic and hydroaromatic) listed above is illustrated in the following examples. Since many of the acids used as calcium salts in the present invention occur in nature as mixtures with each other, it is often convenient and advantageous to use the mixtures directly without separation. Thus the mixed acids derived from linseed oil (largely linoleic, linolenic, and oleic) and natural rosin (mostly abietic with pimaric and other isomeric acids) are used in this way. The salts of the latter are referred to as resinates.

The aliphatic or hydroaromatic acids containing 16 to 22 carbon atoms are preferred, particularly those with ethylenic unsaturation.

This invention is applicable to all types of plastic chloroprene polymers made by polymerization, for example, in the presence of mercaptans or other modifying (chain transfer) agents such as the dialkyl xanthogen disulfides, or in the presence of sulfur, followed by plastiicizing treatment, or by very limited polymerization without agents followed by removal of the unchanged chloroprene monomer. All these processes are fully described in the prior art. See for example U.S. Patents 1,950,436; 2,227,517; 2,234,215; and 2,567,117. The mercaptan-modified polymers of U.S.P. 2,227,517 and 2,567,117 are preferred.

The polymers of chloroprene used include both polychloroprene itself and copylmers of chloroprene with up to an equal weight of other ethylenically unsaturated monomers copolymerizable therewith, such as styrene, acrylic nitrile, methyl methacrylate, isoprene, and 2,3-dichlorobuta diene-1,3. Again, the properties conferred by the co-monomers and the methods for using them are well known in the prior art. Likewise, materials used with the chloroprene polymers as antioxidants, plasticizers, curing agents, accelerators, reinforcing agents, pigments and extenders are well known, as are the quantities which should be used under various circumstances. This prior art is applicable in the present invention. Two recently discovered agents for controlling the effects of heat and light on cured chloroprene polymer stocks are disclosed in U.S. patent applications Ser. No. 39,758 of P. A. Roussel filed June 30, 1960, and now abandoned, and Ser. No. 25,871 of R. O. Becker filed May 2, 1960, published as an abbreviature in 811 O. G. 771. These relate respectively to incorporating (1) 1 to 3% of primary aliphatic mercaptans and (2) a mixture of 5 to 40% of fatty acids with 12 to 22 carbon atoms, or their alkyl esters or glycerides and 0.5 to 5.0% of a non-discoloring antioxidant. The use of these agents along with the calcium salts defined above is a preferred embodiment of the present invention.

The curing step in the present invention is also carried out as in the prior art, temperatures of about 200 to 400° F. and preferably 250 to 350° F. being used.

The following examples illustrate the present invention. Parts and percents are by weight unless otherwise noted:

EXAMPLE 1

A plastic polychloroprene (100 parts by weight), made substantially according to the example in U.S. Patent 2,567,117, referred to above, is compounded with 2 parts of phenyl beta-naphthylamine antioxidant, 29 parts of semi-reinforcing carbon black, 5 parts of zinc oxide, 0.5 part of 2-mercaptoimidazoline accelerator, and 5.5 parts of calcium stearate. This stearate replaces 4 parts of magnesium oxide usually used on this type of formulation. The mixing of the stock is carried out on a rubber mill, using the ordinary precautions for obtaining a good dispersion of the ingredients. The stock is then cured in a press at 307° F. for 30 minutes in the form of slabs from which suitable test pieces are then cut. In comparison with stock containing magnesium oxide instead of calcium stearate and cured in identical manner, the cured material has a compression set (70 hours at 212° F., ASTM D395) of only 20 as compared with 40, and after aging for 7 days at 250° F. in tubes, retains 83% of its elongation at break and increases by only 58% in 100% modulus. These changes in the magnesium oxide control are 70% and 136%, respectively. This shows a quantitative improvement in heat resistance caused by the calcium stearate.

Calcium laurate and palmitate give similar improvements.

The original physical properties of the cured materials, such as modulus, tensile strength, elongation at break, and hardness are practically the same for the calcium salts as for the magnesium oxide control.

EXAMPLE 2

Calcium resinate, a commercial calcium abietate made by fusion of rosin with a neutralizing amount of lime, is tested in comparison with magnesium oxide in the formulation used in Example 1 using 5 parts of the calcium salt and curing for 30 minutes at 307° F. The test pieces containing the calcium salt show much better heat stability. In 14 days in an oven at 250° F. they retain 50% of their elongation at break and increase in 100% modulus by only 210%, as compared with only 39% and 333% for the magnesium oxide control stock. They show excellent resistance to ozone, showing no cracks when exposed under 20% stress to air containing 3 p.p.m. for 266 hours while the controls crack in 12 hours.

EXAMPLE 3

Calcium erucate (8 parts) is compared with 4 parts of magnesium oxide in the formulation used in Examples 1 and 2, using the same testing methods. (Erucic acid is cis-13-docosenoic acid, a $C_{22}$ homolog of oleic.) The compression set is 23 instead of 38 for the control and 78% of the elongation is retained and the 100% modulus increases by only 55% on aging in tubes for 7 days at 250° F., as compared with 65% and 160% for the control.

Calcium oleate, ricinoleate, and linoleate behave similarly. The calcium linoleate and ricinoleate stocks are also very resistant to ozone.

EXAMPLE 4

Calcium ricinoleate (8 parts) is substituted for the 4 parts of magnesium oxide in the following stock, already designed for improved heat resistance by incorporating a fatty oil and an alkyl mercaptan in accordance with the prior art referred to above. This stock contains per 100 parts by weight of plastic polychloroprene:

| | Parts |
|---|---|
| Stearic acid | 0.5 |
| Reaction product of diphenyl amine and diisobutylene | 4.0 |
| Para(paratolyl sulfonylamido)diphenyl amine | 1.0 |
| Whiting | 90.0 |
| Fast extruding furnace carbon black | 20.0 |
| Magnesium oxide | 5.0 |
| Zinc oxide | 15.0 |
| Dodecyl mercaptan | 1.5 |
| 2-mercaptoimidazoline | 1.0 |
| Rapeseed oil | 15.0 |

With the calcium ricinoleate, the compression set measured at 212° F. for 70 hours in stock cured for 25 minutes at 307° F. is only 30% compared with 43% for the magnesium oxide control. Similarly, the calcium ricinoleate stock cured 15 minutes at 307° F. retains 96% of its elongation and increases in 100% modulus by only 67% when aged for 14 days at 250° F. in tubes, as compared with 80% and 100% for the control.

As many widely different embodiments of this invention may be made without departing from the spirit and scope thereof, it is to be understood that this invention is not limited to the specific embodiments thereof except as defined in the appended claims.

What is claimed is:
1. Chloroprene polymer containing as curing agents 2 to 20 parts of zinc oxide and 4 to 20 parts of a calcium salt of a carboxylic acid selected from the group consisting of aliphatic carboxylic acids containing 10 to 30 carbon atoms, decahydronapthalene carboxylic acids, resin acids, and mixtures of said acids, both said parts being by weight per 100 parts by weight of said polymer.

2. Chloroprene polymer containing as curing agents 2 to 20 parts of zinc oxide and 4 to 20 parts of a calcium salt of an unsaturated aliphatic carboxylic acid containing 16 to 22 carbon atoms, both said parts being by weight per 100 parts by weight of said polymer.

3. In the process of curing by heating chloroprene polymer in the presence of zinc oxide and another metal oxide as curing agents, the improvement comprising carrying out the curing step with, in place of said other metal oxide, from 4 to 20 parts by weight of a calcium salt of a carboxylic acid selected from the group consisting of aliphatic carboxylic acids containing 10 to 30 carbon atoms, decahydronapthalene carboxylic acids, resin acids, and mixtures of said acids per 100 parts by weight of said polymer.

4. In the process of claim 3, wherein said carboxylic acid is aliphatic and contains from 16 to 22 carbon atoms.

5. In the process of claim 3, wherein said calcium salt is calcium resinate.

6. A process comprising curing by heating chloroprene polymer in the presence of from 2 to 20 parts of zinc oxide and 4 to 20 parts of a calcium salt of a carboxylic acid selected from the group consisting of aliphatic carboxylic acids containing 10 to 30 carbon atoms, decahydronapthalene carboxylic acids, resin acids, and mixtures of said acids, both said parts being by weight per 100 parts by weight of said polymer, and obtaining as a result thereof chloroprene polymer vulcanizates having improved high temperature properties and ozone resistance.

References Cited by the Examiner

UNITED STATES PATENTS 2,540,596  2/1951  Rehner et al. _____ 260—92.3

JOSEPH L. SCHOFER, *Primary Examiner.*

H. I. CANTOR, *Assistant Examiner.*